US000002046P2

(19) United States

(12) Statutory Invention Registration (10) Reg. No.: US H2046 H

Roberts et al. (43) Published: Sep. 3, 2002

(54) PROCESS FOR MASS PRODUCING UNIFORM MULTI-LAYER NON-LINEAR OPTICAL POLYMER THIN POLAR FILMS

(75) Inventors: M. Joe Roberts; Geoff A. Lindsay, both of Ridgecrest, CA (US); Kenneth J. Wynne, Falls Church, VA (US); Andrew P. Chafin, Ridgecrest, CA (US); John D. Stenger-Smith, Ridgecrest, CA (US); Peter Zarras, Ridgecrest, CA (US); Rena Y. Yee, Ridgecrest, CA (US); Richard A. Holloins, Ridgecrest, CA (US)

(73) Assignee: The United States of America as represented by the Seceretary of the Navy, Washington, DC (US)

(21) Appl. No.: 08/956,017

(22) Filed: Oct. 22, 1997

(51) Int. Cl.[7] ..... B05D 5/06

(52) U.S. Cl. ..... 427/162; 427/169; 427/407.2; 427/430.1

(58) Field of Search ..... 427/162, 169, 427/407.2, 430.1

(56) References Cited

U.S. PATENT DOCUMENTS

| | | | | |
|---|---|---|---|---|
| 5,162,453 | A | 11/1992 | Hall et al. | 525/404 |
| 5,208,111 | A | 5/1993 | Decher et al. | 428/420 |
| 5,225,285 | A | 7/1993 | Hall et al. | 428/413 |
| 5,536,573 | A | 7/1996 | Rubner et al. | 428/378 |

OTHER PUBLICATIONS

Fabrication and properties of light–emitting diodes based on self–assembled multilayers of poly(phenylen vinylene), Fou et al., J Appl. Phys. 79 (10), pp. 7501–7509, May 1996.*

Buildup of ultrathin multilayer films by a self–assembly process, Decher et al., Thin Solid Films. pp. 831–835, 1992.*

Proof of multilayer structural organization in self–assembled polycation–polyanion molecular films, Thin Solid Films, 244(1994) 772–777; Gero Decher, Yuri Lvov and Johannes Schmitt.

Acentric Self–Assembly of an Azo Polymer through Layer–by–Layer Deposition, Polymer Preprints, vol. 38, No. 2, Aug. 1997, pp. 502–503, Srinivasan Balasubramanian, Xiaogong Wang, Hsing Chia Wang, Lian Li, Daniel J. Sandman, Jayant Kumar, Sukant Tripathy, Michael. F. Rubner.

Non–linear optical effects in layer–by–layer alternate films of poyhcations and an azobenzene–containing polyanion, Thin Solid Films, 300 (1997) 107–112; Yuri Lvov, Sunao Yamada, Toyoki Kunitake.

Self–assembled second order nonlinear optical multilayer azo polymer, Macromolar Rapid Communications, vol. 18, 451–459 (1997); Xiaogong Wang, Srinivasan Balasubramanion, Lian Li, Xinli Jiang, Daniel J. Sandman, Michael F. Rubner, Jayant Kumar, Sukaut Tripathy.

* cited by examiner

*Primary Examiner*—Charles T. Jordan

*Assistant Examiner*—Aileen J. Baker

(74) *Attorney, Agent, or Firm*—Gregory M. Bokar; Anthony J. Serventi

(57) ABSTRACT

A process that lends itself to automation for producing multi-layer second-order nonlinear optical polymer (NLOP) thin films by the forming of a polycation layer containing an NLO-active cationic polymer, having non-centrosymmetric chromophores, on a substrate followed by the forming of a polyanion layer, also having non-centrosymmetric chromophores, on the polycation layer. A predetermind number of the polycation and the polyanion layers may be alternated upon the surface as well as one or more buffer layers. An added benefit is the formation of an ultra-smooth surface of the same order of roughness as the substrate upon which the layers are formed.

33 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MASS PRODUCING UNIFORM MULTI-LAYER NON-LINEAR OPTICAL POLYMER THIN POLAR FILMS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

MICROFICHE APPENDIX

Not Applicable.

BACKGROUND OF THE INVENTION

1. Field of the Invention

The present invention relates to the formation of stable multi-layer nonlinear optical polymer (NLOP) films. More particularly, the invention relates to a process of second-order nonlinear optical polymer films which are formed by a solution deposition scheme which results in an electro-optic (EO) film. Still more particularly, the electro-optic films do not require electric-field poling nor undergo high temperature processing treatment.

2. Description of the Related Art

The art of organic polymeric thin films for photonic applications has been a rapidly evolving area of research. One class of materials within this field, NLOP films, has potential for breakthroughs in low cost integrated devices for the telecommunication and data-communication industries. NLOP films are desired in the fabrication of electro-optic (EO) waveguides. This application of the nonlinear optical (NLO) films permits optical signals guided in the films to be switched from one path to another and the phase or amplitude of an optical signal to be modulated at greater than 40 GHz. NLOP films also are desired for sum-difference frequency generation, such as frequency-doubling. Chromophore alignment is stable, remaining constant for several years.

Nonlinear optical polymers are molecular structures which contain chemically attached asymmetric chromophores, also called dyes. Optical nonlinearity is caused by the electrical polarization and polarizability of the chromophore interacting with the electric field of the electromagnetic radiation. Second-order nonlinearity normally occurs in non-centrosymmetric chromophoric films. Asymmetric chromophores must be at least partially aligned in the same direction, called polar alignment, to cause second-order nonlinearity in the NLOP film. See U.S. Pat. No. 5,247,055 issued Sep 21, 1993 to Stenger-Smith et al., U.S. Pat. No. 5,520,968, issued May 28, 1996 to Wynne et al., and the book, Polymers for Second-Order Nonlinear Optics, G. A. Lindsay and K. D. Singer, Eds., Am. Chem. Soc. Advances in Chemistry Series 601, Washington, D.C., 1995.

The electrical polarization in a film is the dipole moment per unit volume. The molecular structure of the chromophore and its orientation govern the nonlinear optical properties of the system. Furthermore, polymer structure facilitates the processability and enhances temporal stability of the final product.

Macroscopic optical properties of NLO films depend on the electrical polarization in the film. In order for films to have a large NLO coefficient, a high concentration of asymmetrical, highly polarizable chromophores arranged in a polar configuration must be present. Films made from nonlinear optical polymers then possess a molecular structure with polar aligned chromophores. This makes the film asymmetrically polarizable.

Polymers may be NLO-active or NLO-inactive. NLO-active polymers are defined as those polymers which have polarizable chromophores with permanent dipole moments. Polymer films that exhibit second-order NLO properties must contain NLO-active polymers with non-centrosymmetric alignment of the chromophores. NLO-inactive polymers are defined as those polymers which contain no polarizable chromophores or chromophores whose ground-state dipole moment is nil.

In the past years, several types of polymers have been developed which are effective in EO modulation of optical signals. Films made from nonlinear optical polymers generally are glassy polymers. Amorphous glassy polymers are transparent and scatter very little light.

Sidechain Polymers:

Sidechain polymers have asymmetric chromophores chemically attached at one point pendant to the backbone of the polymer. For example, the attachment occurs at the electron accepting end or at the electron donating end of the chromophore.

Mainchain Polymers:

In mainchain polymers the chromophores are chemically attached (linked) at both ends resulting in the majority of the chromophore forming part of the backbone. The unique characteristic of this class of polymers is that the asymmetric chromophores can be linked in a head-to-tail pattern (isoregic), head-to-head pattern (syndioregic), or in a random head-to-head and head-to-tail (aregic) pattern. Because chromophores in mainchain polymers are linked at both ends, the chromophores have one less degree of freedom of motion relative to sidechain polymers.

Stability:

There are a number of different types of stability relevant to asymmetrical chromophores. Physical stability refers to the stability of the polar chromophore alignment to relaxation into a nonpolar state. Chemical stability refers to the integrity of the chemical structure of the chromophore, for example, against oxidation or hydrolysis. Photochemical stability refers to the stability of the chromophore to irradiation by light, especially in the presence of oxygen and water. Temporal stability refers to how well the physical, photochemical and chemical stability are maintained at a given temperature. Finally, processing stability refers to how well the polymer handles film processing procedures and various packaging operations. All of the above types of stability are critical if long term temporal stability is to be achieved.

Several methods are known to produce the NLOP films. Two primary techniques used to impart polar order in the film are elevated temperature electric-field poling and room temperature Langmuir-Blodgett processing.

1. Electric-Field Poling:

One method of producing nonlinear optical polymers is the electric field poling of spun-cast films. Thin polymer films are prepared for poling by spin-coating a liquid solution of the polymer (about a 10 to 30% concentration) onto a solid substrate. The solvent is removed by baking the film just above the glass transition temperature (Tg). An electric field is applied across the film in one of two ways:

1) By corona poling the film on a grounded conductor plane near the film's Tg for 1 to 150 minutes.

2) By charging two electrodes contacting the film heated to Tg for 1 to 150 minutes.

Either of these processes can create an electric field of fifty to several hundred volts/micron across the film. The film is then cooled with the field on. After the external field is removed, a net alignment of dipole moments can remain locked in the film for long periods of time, providing that the temperature of the film remains well below any solid state transition, such as the Tg. Electric-field poling removes centrosymmetry, thereby imparting polar order in a film. Generally, the nonlinear optical coefficients increase linearly with poling field until a saturation point is reached, or dielectric breakdown of the film shorts out the electrodes.

There are several problems associated with electric-field poling. First, the polymer utilized must be heated to high temperatures. At these high temperatures thermal disordering of the chromophores works against the torque of the electric field resulting in the chromophores being less well ordered. In addition, polymers containing formal mobile charges are very difficult to pole with an electric field because the charges tend to migrate through the polymer causing dielectric breakdown (i.e. shorting out the electrode).

2. Langmuir-Blodgett (LB) Processing:

Another approach in the preparation of NLOP films is the Langmuir-Blodgett (LB) deposition technique. In conventional LB processing, the polymer molecules are designed to have hydrophilic and hydrophobic groups which cause the polymer to float on the gas-liquid interface in a preferred conformation. These hydrophilic/hydrophobic forces are useful in removing the centrosymmetry by orienting the chromophores normal to the plane of the film.

To make films by LB processing, an organic compound is floated on a liquid, e.g. water, ethylene glycol or other aqueous solutions, in a trough. A solid substrate is dipped through the gas-liquid interface depositing a single molecular layer on the substrate. Thicker films comprised of multiple layers of polymers are built up by repeatedly dipping the substrate into and/or out of the trough, depositing one layer per stroke.

One of the main advantages that conventional LB processing has over electric-field poling is that LB processing may be carried out at room temperature or lower. Furthermore, unlike electric-field poling, formal ionic charges on the polymer need Previous materials utilizing the LB methodology for the fabrication of waveguides (U.S. Pat. No. 5,162,453 issued Nov. 10, 1992 to Hall et al., U.S. Pat. No. 5,225,285 issued Jul. 6, 1993 to Hall et al., U.S. Pat. No. 4,830,952 issued May 16, 1989 to Penner et al, and U.S. Pat. No. 4,792,208 issued Dec. 20, 1988 to Ulman et al.) have suffered from thermal instability due to the presence of low melting alkyl and fluoroalkyl hydrophobic chains. One strategy to increase the thermal stability of LB films is the use of interlayer and/or intralayer covalent bonding (i.e. crosslinking). Another strategy is to attach chromophores to rigid polymer backbones. However, attaching sidechain chromophores to polyimides failed to provide stable multilayer NLOP films. See Thin Solid Films, 244 (1994) 754–757, and Langmuir, 10 (1994) 1160–1163.

A limitation of LB technology is the amount of time required to build up films of sufficient thickness (>0.5 micrometers) for waveguiding. Two ways that the rate of deposition can be increased on the substrate without sacrificing film quality are:

1) Lowering monolayer viscosity by use of higher subphase temperatures, choice of subphase ions, or change of pH. See "Insoluble Monolayers at Liquid-Gas Interfaces" G. L. Gaines, Interscience Publishers, New York, 1966.

2) Utilizing alternative monolayer compression schemes such as the flowing subphase. See Advanced Materials 1991, 3(1), 25–31.

As mentioned earlier, the classical LB processing technique requires that the materials self-assemble into non-centrosymmetric order at an interface between gas and aqueous liquid through a balance of hydrophobicity and hydrophilicity. Typically, by design, functional groups are introduced into the polymer chemical structure to bring about preferential chromophore orientation. These functional groups, especially the alkyl groups which are used for hydrophobicity, lead to a lowering of the Tg and a dilution of the concentration of chromophores. Dilution causes a lowering of the nonlinear optical coefficient of the waveguide.

The criteria for selecting polymers are quite different for Langmuir-Blodgett deposition and electric-field poling process. For example, mobile ionic charges should be absent for best results in electric-field poling because the ions tend to migrate in large electric fields leading to dielectric breakdown of the organic film. For Langmuir-Blodgett deposition, care must be exercised to have the proper balance of hydrophilicity and hydrophobicity. Alternating Polyelectrolyte Deposition (APD):

Alternating Polyelectrolyte Deposition (APD) is performed by alternately dipping a solid substrate in separate aqueous solutions of a polycation and a polyanion. See Thin Solid Films 1992, 210/211, 831. During the APD process, the polyelectrolyte chains in solutions are attracted electrostatically to the substrate. At full substrate coverage, the outer surface carries a net charge of the same sign as the most recently deposited polyelectrolyte. Hence, alternate dipping into solutions of polycation and polyanion, leads to a build up of a uniform film of any desired thickness. In the APD technique, a layer is defined as the result of one polyelectrolyte deposition step.

Unlike the LB technique, a layer in the APD technique can range in thickness depending on whether the polymer chain is tightly coiled or expanded. Individual layer thickness will increase with increasing ionic strength of the polyelectrolyte solution, which can be increased by adding a simple salt such as NaCl or increasing the polyelectrolyte concentration. Ions from the added salt screen the intrachain charges thus allowing the polyelectrolyte chain to adopt a more coiled conformation. Tightly coiled chains yield a thicker deposited layer compared to polymer chains deposited with the more extended conformation characteristic of low ionic strength solutions. See Macromolecules 1993, 26, 7058–7063.

It is desired to have improvements in the field of NLO-films. The process and product of the present invention address this need. The present invention eliminates the need for electric-field poling, eliminates the dilution effect of the hydrophobic alkyl groups, eliminates the need for high temperature treatment, creates stronger ionic bonds between the polymer chains, increases the number of active bi-layers, and increases the concentration of chromophores within the bi-layers by permitting NLO-active polycation and NLO-active polyanion bi-layers.

SUMMARY AND OBJECTS OF THE INVENTION

In view of the foregoing, it is the object of this invention to alternately deposit NLO-active polycation polymer layers and NLO-active polyanion polymer layers by APD that are non-centrosymmetric and have polar order.

Additionally, it is an object of the present invention to provide a process for producing NLOP film using a solution deposition scheme which results in an electro-optic (EO) film which is not required to undergo electric-field poling.

It is a further object of the present invention to provide a process for producing NLOP film using a solution deposition scheme which results in an electro-optic (EO) film which is not required to have undergone high temperature treatment.

These and other objects are achieved by the present invention which includes a process for producing second-order nonlinear optical film comprising the steps of forming a polycation solution layer comprising a NLO-active cationic polymer on a surface of a substrate, wherein the substrate surface optionally has a pre-existing polyanion layer, forming a polyanion solution layer on the polycation layer, and, alternately forming a plurality of the polycation and the polyanion layers thereon.

Other and further advantages of the present invention are set forth in the description and appended claims.

DETAILED DESCRIPTION OF THE INVENTION

Figure 1:
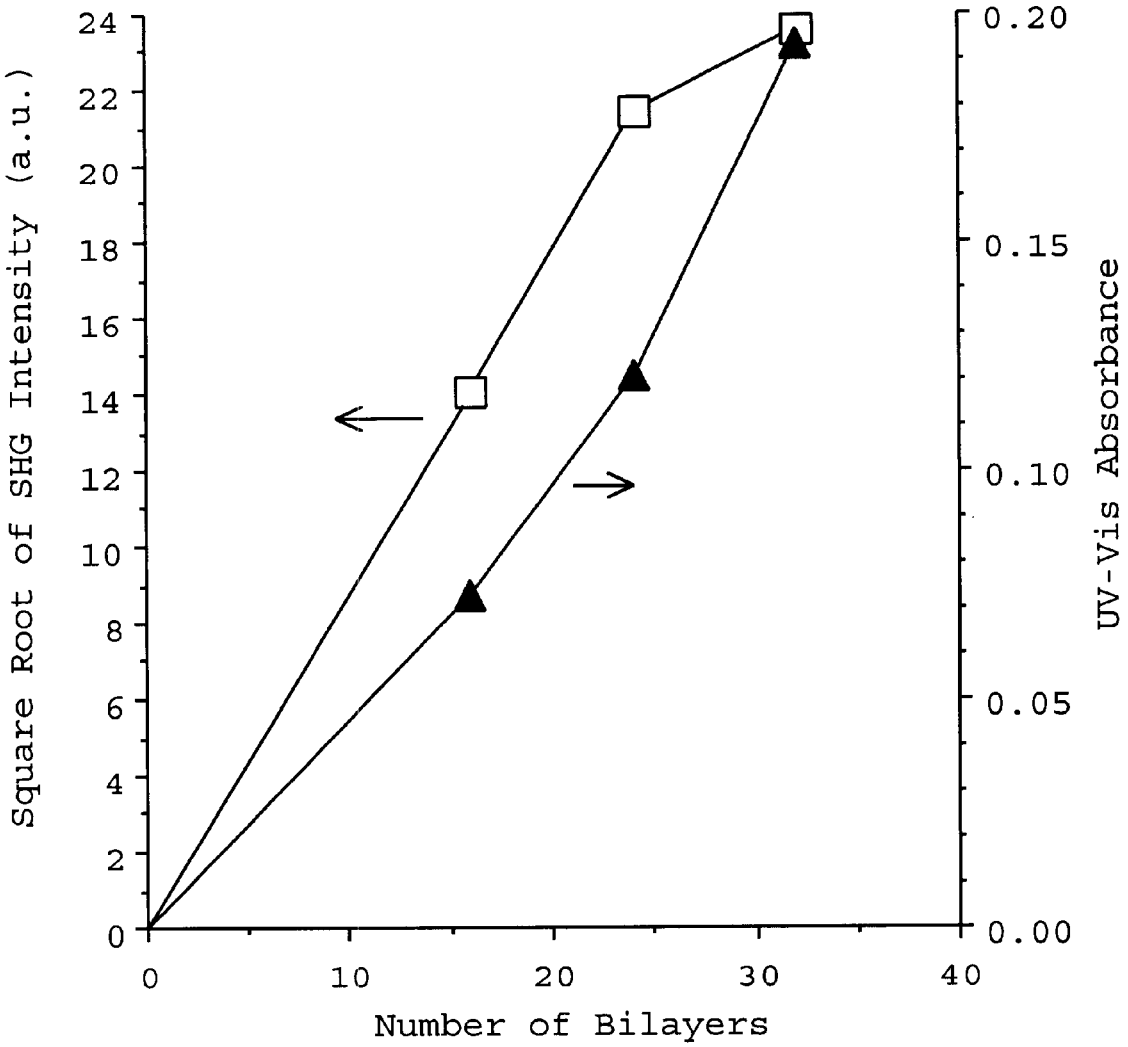
FIG. 1 is a graph illustrating the square root of the SHG and UV-Visible (UV-Vis) absorbance as a function of the number of bi-layers for stilbazolium-substituted polyepichlorohydrin polycation and polystyrene sulfonate polyanion for the present invention.

The present invention is a process for making second-order nonlinear optical polymer films. This process for making nonlinear optical polymer films eliminates the need for electric-field poling and high temperature treatment. The process uses an NLO-active polycationic polymer and a polyanionic polymer, which also may be NLO-active. The process of the present invention applies alternating polyelectrolyte aqueous solution deposition. A multi-layer SHG NLOP EO film results from the alternating polyelectrolyte aqueous solution deposition process of applying a polycation solution comprising a NLO-active cationic polymer and a polyanion solution onto a substrate. This allows many more substrates to be coated simultaneously in an automated process in comparison to the Langmuir-Blodgett and electric-field poling processes.

The polymers of the present invention are either polycations or polyanions that are soluble in a high dielectric solvent such as water, dimethyl sulfoxide, methanol, and the like. Each polycation is paired with a polyanion within a bi-layer. The product of this invention requires the polycation polyelectrolyte be NLO-active and the polyanion polyelectrolyte be either NLO-active or NLO-inactive. The NLO-inactive polyelectrolytes may be linear ionic polymers known to those skilled in the art. The NLO-active polyelectrolytes may belong to any of the general classes of polymer architectures, such as linear ionic polymers with sidechain chromophores or linear ionic polymers with mainchain chromophores, the so-called accordion arranged in the syndioregic configuration the so-called accordion polymers.

Examples of mainchain accordion polymer structures are shown below, wherein B is a bridging group, C is a chromophore whose electron accepting group is at the arrowhead, and y is the number of repeating units. The structures below show four possible combinations of charges and locations of the ionic charges along the polymer chain.

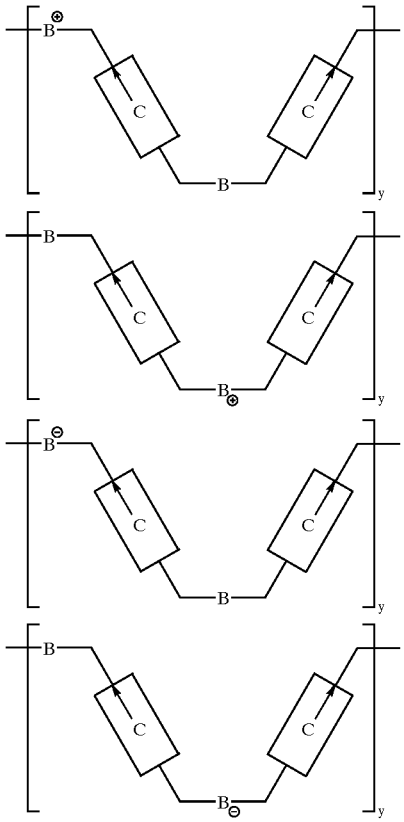

Examples of sidechain polymer structures are shown below, wherein C is a chromophore whose electron accepting group is at the arrowhead, and y is the number of repeating units. The structures below show twelve possible combinations of charges and locations of the ionic charges along the polymer chain.

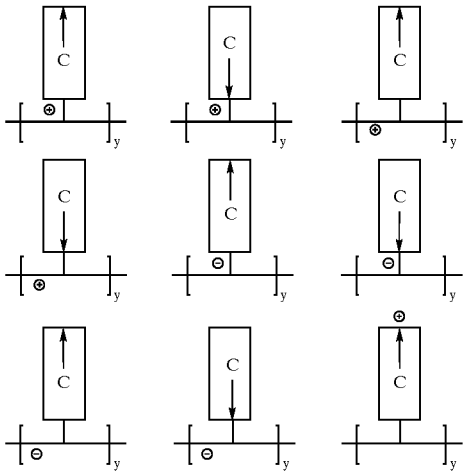

-continued

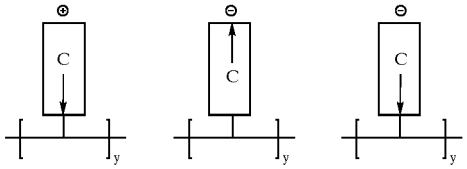

The polycation solution contains an NLO-active cationic polymer. Preferably it is a water-soluble NLOP having asymmetric sidechain chromophores linked to the mainchain by short alkyl spacers. The alkyl spacer may be a flexible group which allows extra degrees of freedom of movement as the chromophores solidify in place. Preferably, the alkyl spacer has from about 1 to about 8 carbon atoms, more preferably from about 1 to about 6 carbon atoms, and most preferably about 1 carbon unit. Additionally, the polymer possesses formal charges on the sidechains, or along the polymer mainchain. More preferably, a stilbazolium sidechain polymer made from polyepichlorohydrin is used as the cationic polymer. Additionally, other NLO-active polycations may be used.

The preferred polycation of stilbazolium-substituted polyepichlorohydrin for the present invention is illustrated below:

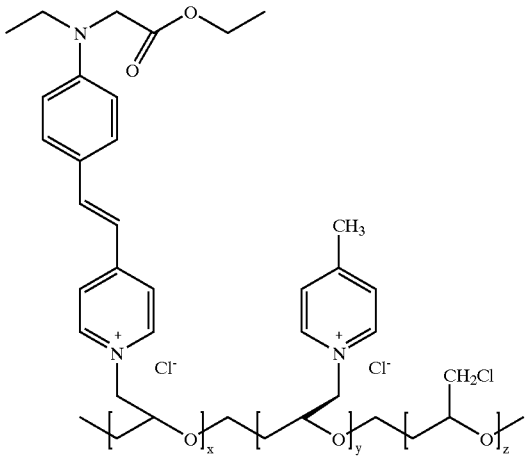

Synthesis of a polyepichlorohydrin with stilbazolium sidechain is described in U.S. Pat. No. 5,225,285 (Hall et. al.), incorporated herein by reference.

The polyanion solution layers of the present invention may result in the deposition of an NLO-active anionic polymer or NLO-inactive polyanion, which allows the polycation NLOP to properly align within the NLO-film. The NLO-active polyanion preferably has the chromophores syndioregic in the polymer backbone with a pendant carboxylate anion tethered to the donor end of each chromophore. The polyanion NLO-inactive or NLO-active polymer may comprise an accordion backbone architecture with ions on every other bridging group.

Examples of NLO-inactive polyanions include polystyrene sulfonates, such as poly(sodium 4-styrenesulfonate), commonly known as PSS, which is available from Aldrich, of Milwaukee, Wis. The PSS structure is illustrated below:

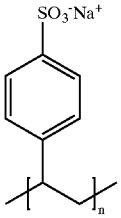

Examples of NLO-active polyanions include sodium salt of poly(2-((4-(2-(N-(2-hydroxyethyl)carbamoyl)-2-cyanovinyl)phenyl) (2-((4-(2-(N-methylcarbamoyl)-2-cyanovinyl)phenyl) (carboxymethyl)amino)ethyl)amino) acetic acid), which is illustrated below:

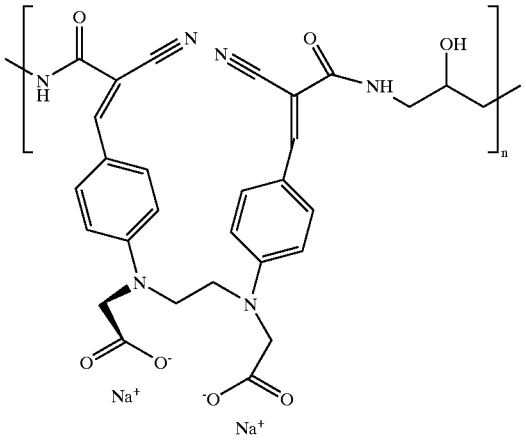

Sodium salt of poly(2-((4-(2-(N-(2-hydroxyethyl) carbamoyl)-2-cyanovinyl)phenyl) (2-((4-(2-(N-methylcarbamoyl)-2-cyanovinyl)phenyl) (carboxymethyl) amino)ethyl)amino)acetic acid) is an α-cyanocinnamamide polyanion. Additionally, other NLO-active polyanions may be used. Preferably, the polyanion is an NLO-active polymer.

The chromophoric polymers may be processed at room temperature into non-centrosymmetric ordered films by the aqueous solution deposition process. A substrate is alternately dipped into aqueous solutions of a cationic NLOP and either an anionic NLO-active polymer or NLO-inactive polyanion is used to create second-order nonlinear optical films. The process for producing second order NLOP films comprising the steps of:

1) forming a polycation solution layer comprising a NLO-active cationic polymer on a surface of a substrate, wherein the substrate surface optionally has a pre-existing polyanion layer,
2) forming a polyanion solution layer on the polycation layer, and,
3) alternately forming a plurality of the polycation and the polyanion layers thereon.

The polycation and polyanion solutions are applied alternately to a substrate. This procedure is conducted in a manner to allow the chromophores within the polycation to align as the polymers within the structure solidify. When used, chromophores within NLO-active polyanions also polar-align as they are applied.

Solutions are formed by dissolving the polycation and polyanion polymers in liquid solvents. Preferably, the polymers are soluble in a solvent which has a high dielectric constant, such as, methanol, dimethylsulfoxide, water, or the like. More preferably, the polymers are soluble in water due to its low cost and low impact on the environment. Preferably, the concentration of ions in the solution is from about $10^{-2}$ molar or less, more preferably from about $10^{-3}$ molar to about $10^{-7}$ molar, and most preferably from about $10^{-5}$ molar to about $10^{-7}$ molar.

When the substrate is placed into the polycation and polyanion solutions, the time of immersion may be varied, generally requiring longer times of immersion for colder solutions. Immersion times for ambient temperatures are preferably from about 1 minute to about 90 minutes, more preferably from about 10 minutes to about 60 minutes, and most preferably from about 20 minutes to about 60 minutes. Temperatures of the solutions are preferably from 5° C. to about 90° C., more preferably from about 20° C. to about 50° C., and most preferably from about 23° C. to about 35° C.

Once applied, the polycation or polyanion solution layers may optionally be rinsed. This rinsing provides a cleaning step prior to the formation of additional film layers. An aqueous rinse solution is used to dissolve and remove formed mobile salts, such as the simple salts of NaCl, LiCl, NaBr or LiBr, and the like, from the film layer into solution. The aqueous solution is preferably ultrapure water, but may be any solution which permits the cleaning of the salts without interfering with the formation of the film layers. Ultrapure water is preferably used to decrease the chance of any disorientation of the chromophores and to ensure smooth application of the subsequent layers. Ultrapure water has been deionized to remove any salts, and filtered through a 0.2 micron pore size filter. In ultrapure water, there is an organic contamination of less than 1 mg per liter volume. The length of time for using the cleaning solution depends on the rate of flow of the cleaning solution and chemical composition. The length of time is gauged to allow sufficient time to remove the salt, but not of such duration as to lift the previously applied film layer. Preferably, the layers are rinsed from about 30 seconds or less, more preferably about 5 seconds to about 20 seconds, and most preferably about 10 seconds. In addition to cleaning the surface of the forming layers, the rinse solution removes droplets of polymer solution from the edges of the substrate.

Additionally, the polycation and polyanion solutions are preferably water-based. Accordingly, the NLO-active polycation polymer and polyanion polymer are water-soluble to provide an even or smooth distribution of the film layers. The pH of the polycation solution is preferably from about 3.0 or higher, more preferably from about 5.0 to about 10, and most preferably from about 5.5 to about 8. The polyanion solution has a pH which is preferably from about 8.0 or higher, more preferably from about 8.0 to about 11, and most preferably from about 8.0 to about 10. Within the polyanion solution, the high pH ensures that any carboxylate groups do not become protonated.

The applied polycation and polyanion solutions preferably have approximately equal concentrations of charges. This permits uniform alignment of the nonlinear optical polymers as they are applied in layers. With increasing ionic strength from the addition of salts, the polyelectrolyte chain increasingly adopts a more coiled conformation. Within the present invention, tightly coiled chains are less likely to produce deposited films with polar order. Solutions optionally may have salts added, such as NaCl, KCl, NaBr, KBr, and the like which increase ionic strength within the solution, but this should be minimized. Preferably, the salt is added at a concentration of from about $10^{-2}$ molar or less, more preferably from about $10^{-6}$ molar or less, and most preferably zero.

Additionally, the solutions are optionally allowed to dry after they are applied to the substrate, prior to the application of a subsequent solution layer. Preferably, this drying step is used. This step allows the orientation of the chromophores in the polycation to remain aligned, and any active nonlinear optical polyanion chromophores also to remain aligned as the layers dry. Additionally, drying the solutions facilitates a uniform surface. The need for the drying step is determined by the polycation and/or polyanion used. Drying is preferably done by air-drying. Drying rates also may be increased by using dry nitrogen or argon, and the like.

The number of bi-layers may be varied. Preferably, the number of NLO-active layers is greater than about 8, more preferably greater than about 16 layers. The number of layer is preferably from about 16 to about 2000 layers, even more preferably from about 16 to about 500, and most preferably from about 16 to about 50 layers. By repeating the application of the polycation and polyanion solutions, the NLOP film may be designed to any specified number of bi-layers to form a multilayer polar film. Accordingly, the number of bi-layers is determined with reference to the use of the product film. Additionally, the layers may include buffer layers, which combine NLO-inactive polycations and NLO-inactive polyanions polymers into the film. These buffer layers are used to smooth the formed polycation or polyanion films, when needed to create a fresh surface for renewed polar layer deposition, to create a plane at which the direction of polarity may be reversed, and to create a lower refractive index of cladding layers for the NLO-active layers. These cladding layers provide a means for confining light in the core layers along the film. Additionally, NLO-inactive layers of compounds such as metal, dielectric polymers, ceramics, glasses and the like, may be formed along the film to form optical cladding, apply electric field or provide mechanical strength and installation, and other functions known in the art. Any number of buffer layers may be incorporated into the film and may be used to increase the thickness of the films. The films may be subsequently etched and patterned with electrodes to form an EO circuit.

In general, the concentration of the chromophores (i.e. the number of chromophores per unit volume) should be large, such as over $10^{20}$/cc, in order to maximize the nonlinear optical effect. However in a waveguide, the light is propagated over long distances and may dissipate because of absorbance loss when the chromophore concentration is too high. A balance of the chromophore concentration must be made to minimize the loss due to absorbance and maximize the nonlinear optical effect.

A NLOP film is formed on a substrate, which may possess a positive, negative or substantially zero net charge. Preferably, the substrate is any solid material on which the polycation and polyanion layers may form. More preferably, the surface of the substrate is a metal electrode or a dielectric optical cladding layer. The substrate may comprise a hydrophobic surface. If desired, the film may be removed from the substrate by various methods known in the art.

The product resultant from the present invention is a film that contains layers of polycation and polyanion with aligned chromophores. These layers may form the core of an optical waveguide. Alternatively, the polyanion may be made of NLO-inactive polymers. The product may also have layers of NLO-inactive polycation polymer films, forming buffer layers within the film. The product is formed by repeating the application of the polycation solution and the polyanion solution until a specified number of bi-layers form a multilayer polar film.

The present invention eliminates the need for large bulky hydrophobic groups usually required by the Langmuir-Blodgett (LB) processing. This allows an increase in the concentration of chromophores in the films. Although not required in the present invention, the films resultant from the present invention may also be poled in an electric-field, by placing the film in an electric field at a temperature near the glass transition temperature of the polymer film, then cooling the film to ambient before removing the electric field, to further enhance the second-order properties of the NLOP films.

Example 1

APD of stilbazolium-substituted polyepichlorohydrin and polystyrenesulfonate bi-layers:

A process for depositing films was developed having alternating layers of the NLO-active polycation, stilbazolium-substituted polyepichlorohydrin, and the NLO-active polyanion, poly(sodium 4-styrenesulfonate). These layers were alternately deposited from aqueous solution to make thin polar films.

A. Preparation of stilbazolium-substituted polymer: Poly (epichlorohydrin) having 0.05 moles of chloromethyl groups and a molecular weight between 500 and 4000 g/mol, was dissolved in 0.15 to 0.50 moles of freshly distilled 4-picoline. The solution was degassed by stirring under reduced pressure, purged with nitrogen gas and heated in reflux in a nitrogen gas atmosphere. A reflux condition was maintained for 24 hours during which time poly(picolinium epichlorohydrin) precipitated from solution. The product was stripped of excess picoline under reduced pressure and dissolved in 100 ml of methanol. The methanol solution was extracted 3 times with equal volumes of cyclohexane, and the product was isolated by removal of the methanol under reduced pressure. Poly(picolinium epichlorohydrin) having 1.0 mmol of picolinium groups and 1.2 mmol 4-(N,ethyl, N-(ethyl acetalyl)aminobenzaldehyde was dissolved in 20 ml of chloroform. 1 to 5 drops of piperidine were added as a catalyst, and the solution was degassed with reduced pressure, purged with nitrogen gas and heated to reflux in an atmosphere of nitrogen gas. A reflux condition was maintained for 16 hours, and the product was isolated by removal of the solvent under reduced pressure. The product was purified by dialysis with methanol, and isolated by removal of the solvent under reduced pressure. During dialysis nearly all of the starting ethyl ester was converted to methyl ester by transesterification. This was determined by GASPE NMR analysis.

A $10^{-5}$ M solution of the polycation was made by dissolving the solid polymer in water from a Barnstead Nanopure water purification system (17.9 Mega Ohm resistivity, 0.2 micron filter).

B. Preparation of polystyrenesulfonate: Polystyrenesulfonate, sold by Aldrich, was used to make a $10^{-4}$ M solution of the polyanion by diluting 20 weight percent water solution with ultrapure water.

Layers were deposited from solutions contained in Coplin staining dishes. The staining dishes were kept in the dark at room temperature (approximately 23° C.) during the film depositions. The substrates were glass slides (Fisher, Cat. # 12-550A) cleaned with $H_2SO_4/H_2O_2$ and made hydrophobic by exposure to refluxing hexamethyldisilazane. Both polymer solutions were filtered through 0.5 micron membrane Millipore filters into the Coplin staining dishes. Both polymer solutions had a pH of 5.5 and no salts were added.

The deposition procedure was performed as follows. The hydrophobic glass slide was immersed in the polycation solution for 60 minutes. The slide was rinsed in ultrapure water for 10 seconds. The slide was dried for 5 minutes in air and then immersed in the polyanion solution for 20 minutes. The slide was removed and rinsed in ultrapure water for 10 seconds and then dried for 10 minutes. Subsequent bi-layers were built up on the substrate by repeating the deposition procedure.

Example 2

APD of stilbazolium-substituted polyepichlorohydrin and the sodium salt of poly(2-((4-(2-(N-(2-hydroxyethyl) carbamoyl)-2-cyanovinyl)phenyl) (2-((4-(2-(N-methylcarbamoyl)-2-cyanovinyl)phenyl) (carboxymethyl) amino)ethyl)amino)acetic acid) bi-layers:

A process for depositing layers was developed having alternating layers of the polycation, stilbazolium-substituted polyepichlorohydrin and the polyanion, sodium salt of poly (2-((4-(2- (N-(2-hydroxyethyl)carbamoyl)-2-cyanovinyl) phenyl) (2-((4-(2-(N-methylcarbamoyl)-2-cyanovinyl) phenyl)(carboxymethyl) amino)ethyl)amino)acetic acid). The latter is a NLO-active polymer with chromophore configured in the mainchain syndioregically with two carboxylate anions per repeat unit. The NLO-active polycation and NLO-active polyanion were alternately deposited from aqueous solution to make thin polar films.

A. Preparation of stilbazolium-substituted polymer: The polycation was prepared in the same manner as described in Ex. 1.

B. Preparation of sodium salt of poly(2-((4-(2-(N-(2-hydroxyethyl)carbamoyl)-2-cyanovinyl)phenyl) (2-((4-(2-(N-methylcarbamoyl)-2-cyanovinyl)phenyl) (carboxymethyl)amino)ethyl)amino)acetic acid): The synthetic scheme used for polymer sodium salt of poly(2-((4-(2-(N-(2-hydroxyethyl)carbamoyl)-2-cyanovinyl)phenyl) (2-((4-(2-(N-methylcarbamoyl)-2-cyanovinyl)phenyl) (carboxymethyl)amino)ethyl)amino)acetic acid) is shown below:

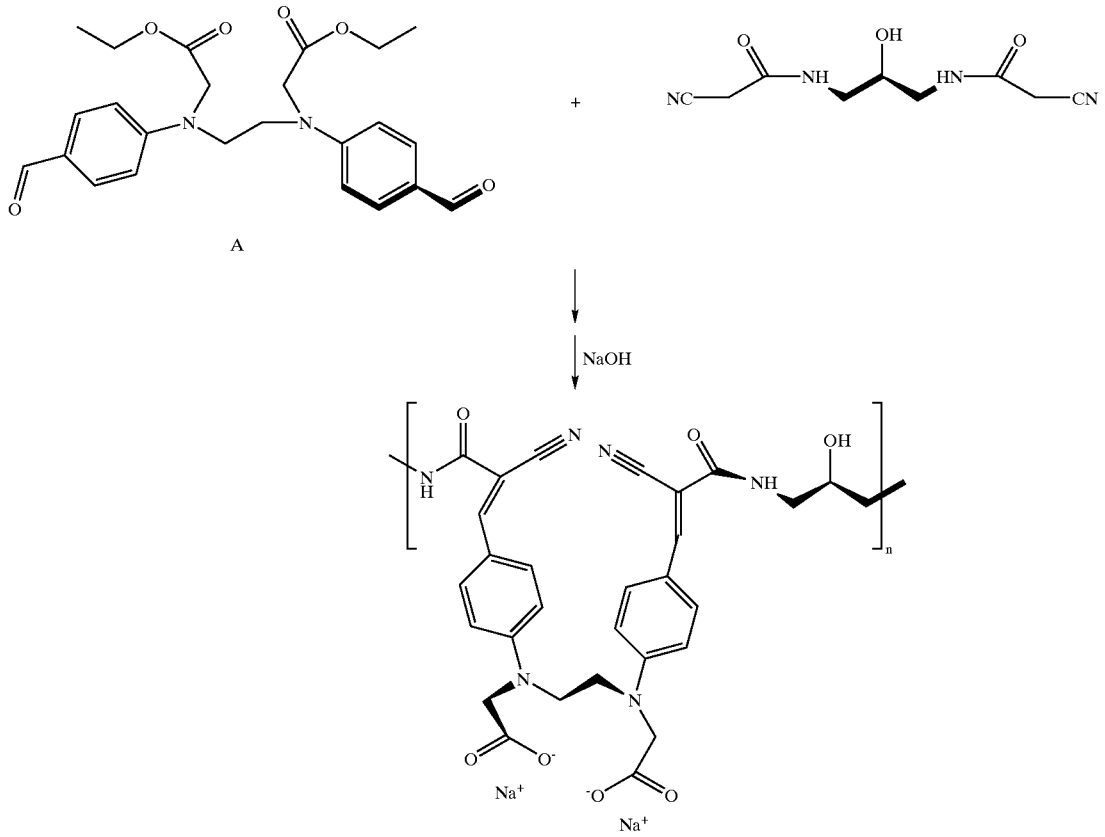

0.1245 grams of monomer A (0.00028 mole) and 0.0633 grams of monomer B (0.00028 mole) and 0.1 grams of DMAP (0.0009 mole) were dissolved in 15 ml of pyridine and heated to 120° C. After 5 days, the degree of polymerization was estimated to be approximately 15 by NMR end group analysis. The solution was then cooled and precipitated into absolute ethanol and stirred overnight, then filtered and dried to give 0.28 grams of wet polymer. Conversion to carboxylate sodium salt was done by suspending 0.13 grams of wet polymer in 10 ml of 1.0 N NaOH and stirring overnight. The solution became completely homogeneous. The solution was dialyzed with 500 Molecular Weight Cut off (MWCO) dialysis tubing against deionized water and then finally against 18 Mohm-cm resistivity water. A $10^{-6}$ M solution of sodium salt of poly(2-((4-(2-(N-(2-hydroxyethyl)carbamoyl)-2-cyanovinyl)phenyl) (2-((4-(2-(N-methylcarbamoyl)-2-cyanovinyl)phenyl) (carboxymethyl) amino)ethyl)amino)acetic acid) was made by diluting a $10^{-3}$ M aqueous solution with ultrapure water.

Layers were deposited from solutions contained in Coplin staining dishes. The solutions were kept in the dark at room temperature (approximately 23° C.) during the film depositions. The substrates were glass slides (Fisher, Cat. # 12-550A) cleaned with $H_2SO_4/H_2O_2$ and made hydrophobic by exposure to refluxing hexamethyldisilazane. Both polymer solutions were filtered through 0.5 micron membrane Millipore filters into the Coplin staining dishes. Both polymer solutions had a pH of 8.0 and no salts were added.

The deposition procedure was performed as follows. The hydrophobic glass slide was immersed in the polycation solution for 60 minutes. The slide was rinsed in ultrapure water for 10 seconds. The slide was dried for 5 minutes in air and then immersed in the sodium salt of poly(2-((4-(2-(N-(2-hydroxyethyl)carbamoyl)-2-cyanovinyl)phenyl) (2-((4-(2-(N-methylcarbamoyl)-2-cyanovinyl)phenyl) (carboxymethyl)amino)ethyl)amino)acetic acid) solution for 20 minutes. The slide was removed and rinsed in ultrapure water for 10 seconds and then dried for 20 minutes. Subsequent bi-layers were built up on the substrate by repeating the deposition procedure.

Example 3

APD of stilbazolium-substituted polyepichlorohydrin and polystyrenesulfonate bi-layers:

A process for depositing films was developed having alternating layers of the polycation, stilbazolium-substituted polyepichlorohydrin, and the polyanion, poly(sodium 4-styrenesulfonate). NLO-active polycation and inactive polyanion were alternately deposited from aqueous solution to make thin polar films.

A. Preparation of 4-(N-diethyl)aminostilbazolium-substituted polyepichlorohydrin: Poly(epichlorohydrin) having 0.05 moles of chloromethyl groups and a molecular weight between 500 and 4000 g/mol, was dissolved in 0.15 to 0.50 moles of freshly distilled 4-picoline. The solution was degassed by stirring under reduced pressure, purged with nitrogen gas and heated in reflux in a nitrogen gas atmosphere. A reflux condition was maintained for 24 hours during which time poly(picolinium epichlorohydrin) precipitated from solution. The product was stripped of excess picoline under reduced pressure and dissolved in 100 mL of methanol. The methanol solution was extracted 3 times with equal volumes of cyclohexane, and the product was isolated by removal of the methanol under reduced pressure. Poly (picolinium epichlorohydrin) having 1.0 mmol of picolinium groups and 1.2 mmol 4-(N-diethyl) aminobenzaldehyde were dissolved in 20 ml of chloroform. 1 to 5 drops of piperidine were added as a catalyst, and the solution was degassed with reduced pressure, purged with nitrogen gas and heated to reflux in an atmosphere of nitrogen gas. A reflux condition was maintained for 16 hours, and the product was isolated by removal of the solvent under reduced pressure. The product was not purified.

A $10^{-5}$ M solution of the polycation was made by dissolving the solid polymer in water from a Barnstead Nanopure water purification system (17.9 Mega Ohm resistivity, 0.2 micron filter).

The polycation structure for example 3 is shown below:

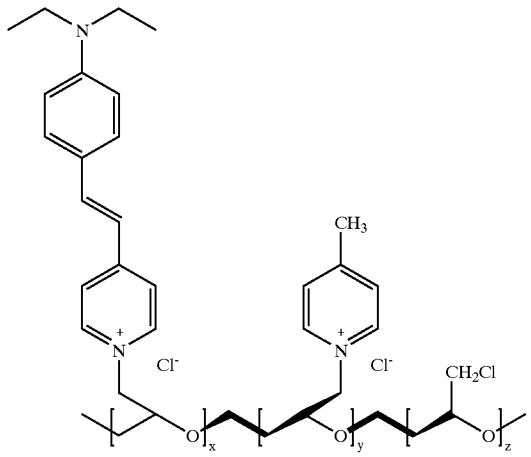

B. Preparation of polystyrenesulfonate: Polystyrenesulfonate, sold by Aldrich, was used to make a $10^{-4}$ M solution of the polyanion by diluting 20 weight percent water solution with ultrapure water.

Films were deposited from solutions contained in Coplin staining dishes. The staining dishes were kept in the dark at room temperature (approximately 23° C.) during the film depositions. The substrates were glass slides (Fisher, Cat. # 12-550A) cleaned with $H_2SO_4/H_2O_2$ and made hydrophobic by exposure to refluxing hexamethyldisilazane. Both polymer solutions were filtered through 0.5 micron membrane Millipore filters into the Coplin staining dishes. Both polymer solutions had a pH of 5.5 and no salts were added.

The deposition procedure was performed as follows. The hydrophobic glass slide was immersed in the polycation solution for 60 minutes. The slide was rinsed in ultrapure water for 10 seconds. The slide was dried for 5 minutes in air and then immersed in the polyanion solution for 20 minutes. The slide was removed and rinsed in ultrapure water for 10 seconds and then dried for 10 minutes. Subsequent bi-layers were built up on the substrate by repeating the deposition procedure.

In Examples 1–3, as the polymer solutions aged, the quality of the layer deposition became nonuniform, that is, the observed UV-Visible peak maxima ceased to increase linearly as more layers are deposited. To remedy this situation, fresh polymer solutions were prepared and used after approximately every 8 bi-layers of deposition given the timing described above.

In all cases, uniform layer to layer deposition was observed as evidenced by linear increase of UV-Vis absorbance and quadratic increase of second harmonic generated light intensity as a function of film thickness. Films were uniformly deposited up to 24 bi-layers for examples 1, seven bi-layers for example 2, and three bi-layers for example 3.

FIG. 1 is a graph illustrating the square root of SHG and UV-Visible (UV-Vis) absorbance as a function of the number of bi-layers for stilbazolium-substituted polyepichlorohydrin polycation and polystyrene sulfonate polyanion for the present invention. Referring to FIG. 1, the square root of the SHG and UV-Vis absorbance increase linearly with additional numbers of bi-layers (thickness) of polycation and polyanion. Beyond 24 bi-layers, the square root of the SHG signal begins to plateau.

Figure 2:
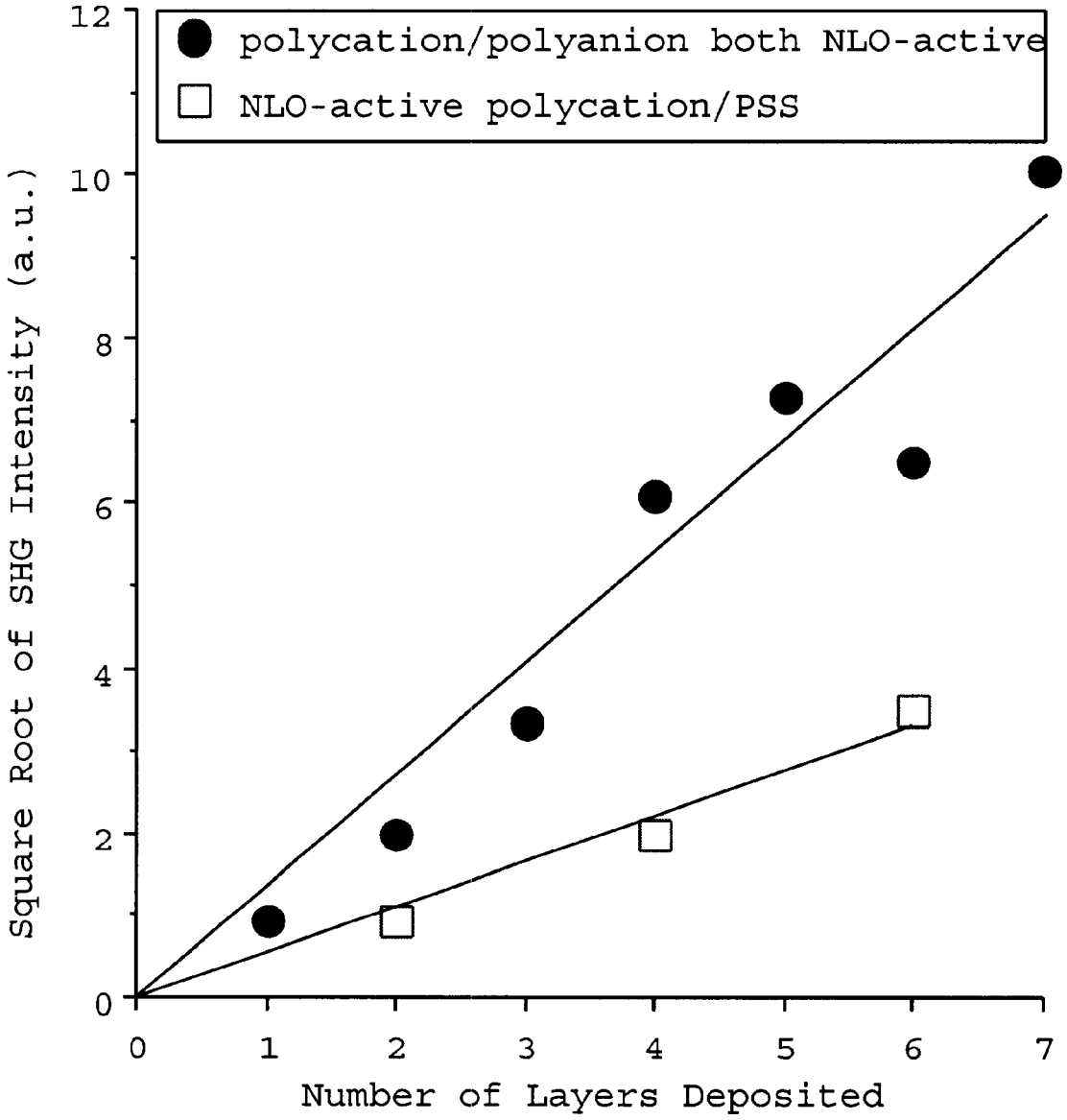
FIG. 2 is a graph illustrating the square root of the SHG as a function of the number of bi-layers of stilbazolium-substituted polyepichlorohydrin polycation and polystyrene sulfonate polyanion compared to bi-layers of stilbazolium-substituted polyepichlorohydrin polycation and sodium salt of poly(2-((4-(2-(N-(2-hydroxyethyl)carbamoyl)-2-cyanovinyl)phenyl) (2-((4-(2-(N-methylcarbamoyl)-2-cyanovinyl)phenyl) (carboxymethyl)amino)ethyl)amino) acetic acid) polyanion for the present invention.

FIG. 2 is a graph illustrating the square root of SHG as a function of the number of bi-layers of stilbazolium-substituted polyepichlorohydrin polycation and polystyrene sulfonate polyanion (indicated by squares) compared to bi-layers of stilbazolium-substituted polyepichlorohydrin polycation and sodium salt of poly(2-((4-(2-(N-(2-hydroxyethyl)carbamoyl)-2-cyanovinyl)phenyl) (2-((4-(2-(N-methylcarbamoyl)-2-cyanovinyl)phenyl) (carboxymethyl)amino)ethyl)amino)acetic acid) polyanion (indicated by circles) for the present invention.

UV-Visible Spectroscopy and Second Harmonic Generation Characterization of the Films The transmission UV-Vis spectra of the films were obtained with a Cary 5 NIR-Vis-UV spectrometer. The films were referenced to glass and the glass background was subtracted to obtain the film spectra.

Second harmonic generation (SHG) measurements were made in transmission with an incident beam at approximately 54° from normal. The SHG signal was generated by transmission of a fundamental beam from a Q-switched Nd:YAG laser, with a pulse width of 10 ns and repetition rate of 10 Hz. The SHG signal was detected with an intensified Tracor Northern Si diode array.

Film Roughness Measurements

Film roughness was characterized by microprofilometry using a Wyco 3D microprofilometer, which has a vertical resolution of 0.2 nm. Over a 240×230 micrometer area, bare hexamethyldisilazane (HMDS) treated glass slides had a RMS roughness of 1.2 nm, a 22 bilayer of polycation/PSS solution deposited film had a root mean square (RMS) roughness of 1.0 nm, and a 7 layer film of polycation/NLO-active polyanion had a RMS roughness of 0.6 nm. These data indicate that these solution deposited films have roughness values that do not increase above the roughness values of the substrate.

It should be understood that the foregoing summary, detailed description, examples and drawings of the invention are not intended to be limiting, but are only exemplary of the inventive features which are defined in the claims.

What is claimed is:

1. A process for producing a uniform multi-layer second-order nonlinear optical polymer (NLOP) thin film incorporating aligned non-centrosymmetric chromophores, the chromophores each having an electron-donor end and an electron-receptor end, the process comprising:

dipping a substrate, having upper and lower surfaces and a thickness, said thickness being in a plane of said substrate roughly perpendicular to said upper and lower surfaces, into a first aqueous solution containing an NLO-active cationic polymer having at least one repeating unit and incorporating positive ions, wherein at least one of said upper and lower surfaces has a net negative charge permanently imposed thereon; removing said substrate from said first solution after a first soak time; cleaning said substrate using a suitable solvent for a first pre-determined cleaning time;

drying said substrate for a first pre-determined drying time;

wherein said dipping in said first solution, cleaning, and drying results in the forming of a polycation layer of NLOP on at least one of said upper and lower surfaces;

dipping said substrate into a second aqueous solution containing an anionic polymer having at least one repeating unit and incorporating negative ions;

removing said substrate from said second solution after a second soak time;

cleaning said substrate using a suitable solvent for a second pre-determined cleaning time;

drying said substrate for a second pre-determined drying time; wherein said dipping in said second solution, cleaning, and drying results in the forming of a polyanion layer on said polycation layer; and repeating said dipping, cleaning, drying processes so that a predetermined plurality of alternating said polycation and said polyanion layers are built up uniformly upon said at least one surface of said substrate. wherein said process is performed in a manner to allow the chromophores within the cationic polymer to align as said cationic and anionic polymers within the structure solidify.

2. The process of claim 1 wherein said cleaning involves contact with a cleaning solvent selected from the group consisting of: an alcohol, an aromatic, water, and any combination thereof.

3. The process of claim 1 wherein said cleaning is rinsing with ultrapure water.

4. The process of claim 1 wherein said drying is carried out in a process selected from the group consisting of: drying in ambient air, drying in inert gas, drying in heated air, drying in heated inert gas, drying in a vacuum, and any combination thereof.

5. The process of claim 1, further comprising repeating the forming of each of said polycation and said polyanion layers from about 3 or more times.

6. The process of claim 1, wherein said ions are present in a concentration of from about $10^{-2}$ M or less in said first and second aqueous solutions, wherein said first and second aqueous solutions are formed by dissolving said polycation and said polyanion polymers in separate vessels containing first and second fluid solvents, respectively, wherein said first and second fluid solvents are selected from the group consisting of: methanol, dimethylsulfoxide and water.

7. The process of claim 6, wherein said ions are present in a concentration of from about $10^{-3}$ M to about $10^{-7}$ M in said first and second solutions.

8. The process of claim 7, wherein said ions are present in a concentration of from about $10^{-5}$ molar to about $10^{-7}$ molar in said first and second solutions, wherein said cationic polymer and said anionic polymer are water soluble and wherein said first and second fluid solvents consist mainly of water.

9. The process of claim 1, wherein said cationic polymer has an asymmetric sidechain chromophore on each said repeating unit of said cationic polymer, wherein said sidechain chromophore is linked to the main chain by short alkyl spacers.

10. The process of claim 9, wherein said short alkyl spacers contain from one to eitht carbon atoms.

11. The process of claim 9, wherein said first cationic solution comprises stilbazolium-substituted polyepichlorohydrin.

12. The process of claim 1, wherein said second anionic solution comprises an NLO-active anionic polymer.

13. The process of claim 1, wherein said second anionic solution contains an NLO-active anionic polymer having an accordion backbone architecture incorporating bridging grousp with said negative ions on every other said bridging group, wherein said NLO-active anionic polymer has the chromophores syndioregic in said backbone with a pendant carboxylate anion tethered to the donor end of each chromophore.

14. The process of claim 1, wherein said second anionic solution contains an NLO-inactive polymer.

15. The process of claim 14, wherein said NLO-inactive polymer is poly(sodium 4-styrenesulfonate).

16. The process of claim 13, wherein said NLO-active anionic polymer is a sodium salt of poly(2-((4-(2- (N-(2-hydroxyethyl)carbamoyl)-2-cyanovinyl)phenyl) (2-((4-(2-(N-methylcarbamoyl)-2 cyanovinyl)phenyl) (carboxymethyl)amino)ethyl)amino)acetic acid).

17. The process of claim 1, wherein said first cationic and said second anionic solutions have approximately equal concentrations of said ions.

18. The process of claim l, further comprising repeating the forming of each of said polycation and said polyanion layers from about 8 or more times.

19. The process of claim 1, wherein said substrate comprises at least one hydrophobic surface upon said upper and lower surfaces, said hydrophobic surface having substantially zero net charge.

20. The process of claim 1, further comprising adding at least one buffer layer on at least one of said alternating polycation and polyanion layers.

21. The process of claim 1, further comprising maintaining the pH of said polycation solution in the range from 3.0 to 10.0.

22. The process of claim 1, further comprising maintaining the pH of said polyanion solution in the range from 8.0 to 11.0.

23. The process of claim 1, wherein said first soak time is in the range from 1 minute to 90 minutes, said second soak time is in the range from 1 minute to 90 minutes, said first and second pre-determined cleaning times are in the range from 5 seconds to 30 seconds.

24. The process of claim 1, wherein said process is carried out at a temperature in a range from 5° C. to 90° C.

25. The process of claim 10 wherein said short alkyl spacers contain one carbon atom.

26. The process of claim 1, wherein selection of said cationic and anionic polymers incorporated in said first and second solutions and processing of said substrate is controlled so that the roughness of said alternating layers does not exceed that of said substrate as originally configured.

27. The process of claim 1 wherein the non-centrosymmetric chromophores of said polycation and polyanion layers are attached as main chain non-centrosymmetric chromophores.

28. The process of claim 1 wherein said first solution contains an anionic polymer, said second solution contains an NLO-active cationic polymer and said at least one of said upper and lower surfaces has a net positive charge permanently imposed thereon.

29. The process of claim 28 wherein said first anionic solution comprises an NLO-active anionic polymer.

30. The process of claim 1 wherein said substrate is physically separated from the multi-layer NLOP thin film.

31. The process of claim 28 wherein said substrate comprises at least one hydrophobic surface upon said upper and lower surfaces, said hydrophobic surface having substantially zero net charge.

32. A process for producing an electro-optic waveguide, having a core and cladding, wherein the process for making the core comprises:

dipping a substrate, having upper and lower surfaces and a thickness, said thickness being in a plane of said substrate roughly perpendicular to said upper and lower surfaces, into a fresh first solution containing an NLO-active cationic polymer having non-centrosymmetric chromophores and at least one repeating unit and incorporating positive ions, wherein at least one of said upper and lower surfaces has a net negative charge permanently imposed thereon;

removing said substrate from said first solution after a first soak time;

cleaning said substrate using a suitable solvent for a first pre-determined cleaning time;

drying said substrate for a first pre-determined drying time; wherein said dipping in said first solution, cleaning, and drying results in the forming of a polycation layer of NLOP, having non-centrosymmetric chromophores, on at least one of said upper and lower surfaces;

dipping said substrate into a fresh second solution containing an anionic polymer, having non-centrosymmetric chromophores and at least one repeating unit and incorporating negative ions;

removing said substrate from said second solution after a second soak time;

cleaning said substrate using a suitable solvent for a second pre-determined cleaning time;

drying said substrate for a second pre-determined drying time; wherein said dipping in said second solution, cleaning, and drying results in the forming of a polyanion layer on said polycation layer; and repeating said dipping, cleaning, drying processes so that a predetermined plurality of alternating said polycation and said polyanion layers are built up uniformly upon said at least one surface of said substrate.

33. The process of claim 32 further comprising adding at least one buffer layer on at least one of said alternating polycation and polyanion layers.

* * * * *